UNITED STATES PATENT OFFICE.

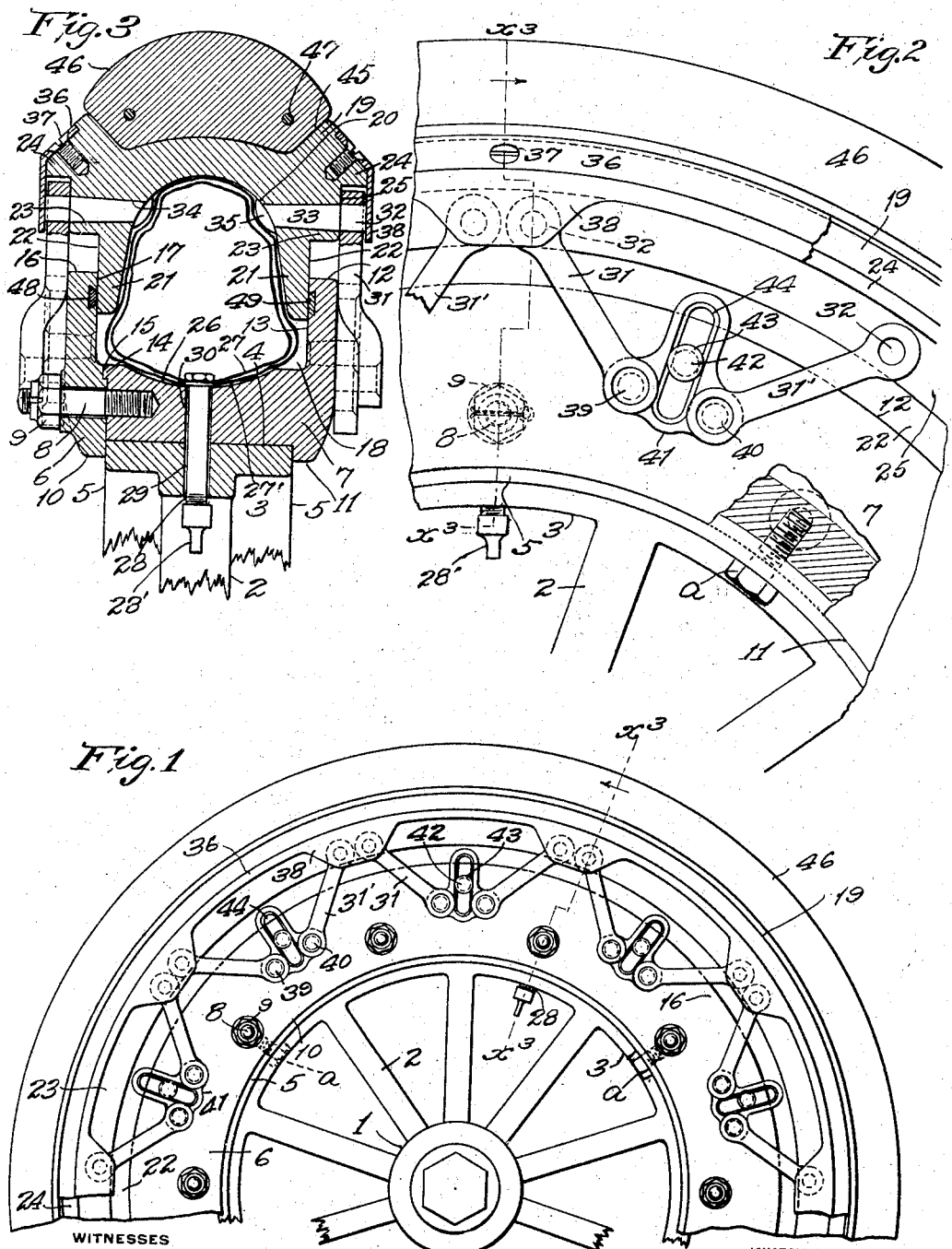

CHARLES H. WEISKOPF, JR., OF LOS ANGELES, CALIFORNIA.

RESILIENT WHEEL.

1,100,040.   Specification of Letters Patent.   Patented June 16, 1914.

Application filed June 26, 1911. Serial No. 635,456.

*To all whom it may concern:*

Be it known that I, CHARLES H. WEISKOPF, Jr., a citizen of the United States, residing at Los Angeles, in the county of Los Angeles and State of California, have invented a new and useful Resilient Wheel, of which the following is a specification.

The objects of this invention are: to provide a cheap, strong effective wheel having a non-puncturable resilient tire that will be a practical substitute for the present forms of pneumatic tire with the additional advantage of being non-puncturable and which will not be subject to injury by use in case of deflation of the inner pneumatic tube; to provide a separable tire by which to apply the invention to vehicle wheels now in use.

This construction includes a rigid annular tread which may be of cast steel or other suitable material formed in one or more pieces and mounted on the felly of the wheel through the medium of an annular rim and held apart from such rim by an elastic pneumatic inner tube; said tread and rim together with connecting elements constituting a tire which is made resilient by the inner pneumatic tube that may be protected by a strong cover of water proof canvas or other flexible material.

Specific features of the invention include means for holding and guiding said tread relative to the rim.

This invention may be carried out in different forms and includes the novel tire and the parts and combinations of parts set forth in the subjoined detail description.

The accompanying drawings illustrate the invention.

Figure 1 is a fragmental side elevation of a resilient wheel constructed in accordance with this invention in the form that is at present deemed most desirable. Fig. 2 is an enlarged fragmental detail of the same wheel viewed from the other side. Fig. 3 is an irregular cross section on line partially indicated by $x^3$, Figs. 1 and 2.

The wheel body including the hub 1, spokes 2 and felly 3 may be of any desired material and construction, the peripheral face 4 of the felly being preferably cylindrical and the sides 5 of said felly being normal to the axis of the wheel.

Surrounding the felly 3 is a rim composed of two annular sections 6, 7, held together by suitable fastening means as the stud bolts 8 threaded at both ends inserted through one of the sections 6 and screwed into the other section 7, and nuts screwed onto the outer ends of the bolts 8 the intermediate portion of which bolts are preferably cylindrical and unthreaded. The sections of the sectional rim are provided with flanges 10 and 11 to engage the flat sides 5 of the felly 3, so that when the sections 6 and 7 are clamped in place on the felly 3, the sectional rim will be firmly held in place on the felly against lateral displacement. Capscrews *a* through the felly 3 into the rim 7 serve to hold the rim rigidly in place and prevent the tire from creeping on the felly.

The main section 7 of the rim is provided on one side with an annular guard 12, the inner face 13 of which lies in a plane that is parallel with the mid-plane of the wheel; and said section is provided on the other side with the annular shoulder 14. The section 6 is provided with an annular gain 15 to receive said shoulder 14 and also with an annular guard 16 corresponding to the guard 12 and provided with an inner face 17 which lies in a plane parallel with the face 13, thus forming outside the main rim a way 18 in the nature of an outwardly peripherally opening annular groove.

The tread comprises an annular body 19 having an inwardly opening annular groove 20 the side walls 21 of which have flat outer parallel faces 22 fitting between the guards 12 and 16 and being of less radial width than said guards, there being lateral annular extensions 23 externally of the side walls 21, and lateral overhanging annular flange shoulders 24 surrounding flat annular parallel faces 25. The walls 21 are of less depth radially of the wheel than the guards 12 and 16, so that when the parts are assembled and the felly and rim are relatively moved to the fullest extent in one direction, there will be a considerable vacant space between the side walls 21 and the periphery of the section body 7. Said body 7 is provided peripherally with a concave seat in the form of an annular channel 26 to receive a resilient ring or cushioning body as the inner pneumatic tube 27 that may be of any approved construction and provided with a canvas cover 27'; and is supplied with compressed air through the usual tube 28 extending through radial holes 29, 30 in the felly and the rim 7 and provided with the usual cap 28'. The annular shoulders 24 serve several purposes. They form a recess in which the outer ends of links 31 are pivoted by straight cylindrical pivots 32 having inwardly tapering stems 33 extending through taper holes 34 that extend through the walls 21 and are riveted inside the channel 20 to form heads 35, thus securely fixing the pivots in the tread. The shoulders 24 also form seats for the retainers which are composed of annular conical bands 36 fastened to the tread 19 by screws 37 and provided with retaining ears 38 to extend over the outer ends of the link pivot pins, also to form a protection to prevent objects in the street or road from striking the link. The links are arranged in pairs and the members 31 and 31' of each pair converge toward the axis of the wheel and are pivotally connected by pins 39, 40 with a slotted equalizer 41 which is fastened to the sectional rim by a headed pin 42 secured to the guard 12 or 16 in much the same manner as the pins 33 are secured to the tread body 19. The outer heads 43 of said pins 42 engage in countersunk slots 44 in the equalizer and said equalizer is adapted to turn pivotally and to slide relative to the pins 42, thus allowing relative movement between the wheel rim and the tread. Said tread may be made practically in one piece, by casting or otherwise, or may be in sections securely fastened together by any well-known means. Said tread is provided with an external channel 45 in which is secured in the usual manner a solid rubber tread 46 held by the wire bands 47.

The inner faces of the guards 12 and 16 are provided with dovetail channels 48 in which may be seated felt packing 49 with a view to prevent the admission of dust and dirt into the channel 18.

In practice to assemble the wheel the rim section 7 may first be applied on the outside of the peripheral face 4 of the felly 3 and the collapsed inner pneumatic tube 27 and canvas covering 27' may be moved into place on the rim section 7 and the valve tube 28 will be passed through the hole 29. Then the tread, devoid of the retaining bands 36 and the links 31, 31' is brought into place around the collapsed inner tube. Then the rim section 6 will be brought into place and secured by the stud bolts 8 and nuts 9. The equalizers and their links 31, 31' may then be placed on the pins 42 and pivots 32; and the pins 42 may be riveted over to secure the equalizers thereon. Then the retainers 36 may be fastened in place by the screws 37, so that the ears 38 will cover the outer ends of the links 31 and 31'. The inner tube may then be inflated in the usual manner, thus holding the tread equi-distant at all points from the rim.

It is preferable in manufacturing this wheel that the felly of the wheel shall have parallel sides 5 as shown in the drawing, but it is understood that in any instance the rim section 7 and 6 may be constructed to fit a given felly so that they together with the parts external thereto may be manufactured independently of the hub, spokes, and fellies of the wheels, to which they are to be applied but with reference thereto, thus allowing the manufacturer to simply make, assemble and market the rim and the parts external thereto as a tire to be applied as a substitute for the tires of wheels already in use, the rim of each tire being constructed to fit any one of the wheel fellies of a determined type and size.

The sectional rim and the tread, being both provided with annular channels as shown supply an annular chamber that houses the pneumatic tube and preserves it from external attack.

I claim:—

1. A wheel comprising a felly, a sectional rim for the felly, means to fix the rim sections on the felly, a tread on the rim and movable in a path normal to the axis of the wheel, a resilient ring between the tread and the rim and paired pivoted links and equalizer means joining the links of each pair to guide said tread in said path.

2. A wheel comprising a channeled rim, a tread provided with annular side walls working in said channeled rim, equalizers pivoted to the rim, links pivoted at their ends to the equalizers and to the annular side walls to limit the outward movement of the tread, and a pneumatic tube for resiliently holding the tread and rim apart.

3. The combination with a felly, of a channeled rim, a tread provided with a channel and with side walls extending in the channel of the rim, a pneumatic tube between the rim and tread, pins on the rim, equalizers provided with slots on said pins and pairs of links pivotally connecting the tread with said equalizers on opposite sides of their pins respectively.

4. A wheel comprising a felly, a rim for the felly, means to fix the rim on the felly, a tread on the rim and movable in a path normal to the axis of the wheel, a resilient body between the tread and the rim, links to guide said tread in said path, pins connecting the links to the tread, lateral annular flange shoulders on the tread and overhanging the guide means, and retaining ears on said shoulders extending over the outer ends of said pins.

In testimony whereof, I have hereunto set my hand at Los Angeles, California, this 20th day of June, 1911.

C. H. WEISKOPF, Jr.

In presence of—
JAMES R. TOWNSEND,
L. BELLE RICE.

---

Copies of this patent may be obtained for five cents each, by addressing the "Commissioner of Patents, Washington, D. C."